United States Patent
Joyner et al.

(10) Patent No.: US 7,500,788 B2
(45) Date of Patent: Mar. 10, 2009

(54) CENTER BEARING ASSEMBLY HAVING AN ADJUSTABLE PNEUMATIC SUPPORT MEMBER

(75) Inventors: Robert G. Joyner, Toledo, OH (US); James A. Duggan, Temperance, MI (US); Johnny N. Smith, Toledo, OH (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 267 days.

(21) Appl. No.: 11/322,667

(22) Filed: Dec. 30, 2005

(65) Prior Publication Data

US 2006/0147143 A1    Jul. 6, 2006

Related U.S. Application Data

(60) Provisional application No. 60/640,908, filed on Dec. 31, 2004.

(51) Int. Cl.
*F16C 27/06* (2006.01)
(52) U.S. Cl. .................. 384/536; 384/495; 384/448
(58) Field of Classification Search ............ 384/535, 384/536, 581, 582, 445, 495, 519, 558, 583, 384/448
See application file for complete search history.

(56) References Cited

U.S. PATENT DOCUMENTS

| | | | |
|---|---|---|---|
| 2,155,919 A | 4/1939 | Wooler et al. | |
| 2,687,925 A | 8/1954 | Gair | |
| 4,669,893 A | 6/1987 | Chalaire et al. | |
| 4,867,655 A | 9/1989 | Barbic et al. | |
| 4,872,767 A | 10/1989 | Knapp | |
| 4,947,639 A | 8/1990 | Hibner et al. | |
| 4,971,457 A | 11/1990 | Carlson | |
| 4,971,458 A | 11/1990 | Carlson | |
| 4,983,051 A | 1/1991 | Hibner et al. | |
| 5,154,516 A | 10/1992 | Speich | |
| 5,172,985 A * | 12/1992 | Constancio | 384/536 |
| 5,501,531 A * | 3/1996 | Hamaekers | 384/536 |
| 5,769,545 A | 6/1998 | Bently et al. | |
| RE36,270 E * | 8/1999 | Duggan | 384/535 |
| 6,883,967 B2 * | 4/2005 | Robb et al. | 384/536 |
| 2002/0081050 A1 * | 6/2002 | Cermak | 384/536 |

* cited by examiner

*Primary Examiner*—Thomas R Hannon
(74) *Attorney, Agent, or Firm*—MacMillan, Sobanski & Todd, LLC

(57) ABSTRACT

A center bearing assembly has an adjustable pneumatic support member for absorbing vibrations. The bearing assembly includes a bearing and a support member assembly that supports the bearing. The support member assembly includes a bladder having an interior chamber that is filled with a fluid. A bracket is provided that supports the support member assembly for pivoting movement relative thereto. A system is provided for controlling the magnitude of the fluid pressure within the interior chamber of the bladder. The system includes a plurality of sensors that generate signals that are representative of a plurality of operating conditions. A controller is responsive to the sensor signals and generates a signal to a pressure regulating device that controls the magnitude of the fluid pressure within the interior chamber of the bladder.

20 Claims, 4 Drawing Sheets

CENTER BEARING ASSEMBLY HAVING AN ADJUSTABLE PNEUMATIC SUPPORT MEMBER

CROSS-REFERENCE TO RELATED APPLICATIONS

This application claims the benefit of U.S. Provisional Application No. 60/640,908, filed Dec. 31, 2004, the disclosure of which is incorporated herein by reference.

BACKGROUND OF THE INVENTION

This invention relates in general to bearings for supporting shafts for rotation. In particular, this invention relates to an improved structure for a center bearing assembly having an adjustable pneumatic support member.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

In some vehicles, the distance separating the engine/transmission assembly and the axle assembly is relatively short. For these vehicles, the driveshaft assembly can be formed from a single, relatively long driveshaft tube having the first and second end fittings secured to the ends thereof. In other vehicles, however, the distance separating the engine/transmission assembly and the axle assembly is relatively long, making the use of a single driveshaft tube impractical. For these vehicles, the driveshaft assembly can be formed from a plurality of (typically two) separate, relatively short driveshaft sections. In a compound driveshaft assembly such as this, a first end of the first driveshaft section is connected to the output shaft of the engine/transmission assembly by a first universal joint, a second end of the first driveshaft section is connected to a first end of the second driveshaft section by a second universal joint, and a second end of the second driveshaft section is connected to the input shaft of the axle assembly by a third universal joint.

A compound driveshaft assembly that is composed of two or more separate driveshaft sections usually requires the use of a structure for supporting the intermediate portions thereof for rotation during use. A typical intermediate support structure for a driveshaft assembly (which is commonly referred to as a center bearing assembly) includes an annular bearing having an inner race that engages one of the driveshaft sections and an outer race that supports the inner race for rotation relative thereto. The outer race of the annular bearing is supported within a generally annular support member that is usually formed from a relatively resilient material, such as rubber. The resilient support member is, in turn, supported within a rigid bracket that is secured to a support surface provided on the vehicle. Thus, the center bearing assembly functions to support the intermediate portion of the driveshaft assembly for rotation during use. Many center bearing assembly structures of this general type are known in the art.

The resilient support member is provided in the center bearing assembly to absorb vibrations of the driveshaft assembly and thus minimize the magnitude of such vibrations that are transmitted therethrough to the vehicle frame. However, when such vibrations of the driveshaft assembly occur at frequencies that are at or near the natural resonant frequency of the resilient support member in the center bearing assembly, then the center bearing assembly may not absorb such driveshaft assembly vibrations as effectively as desired. To prevent this from occurring, it is known to provide a resilient support member in the center bearing assembly having a natural resonant frequency that is different from the frequencies of the vibrations that are generated by the driveshaft assembly under normal operating conditions of the vehicle. However, it has been found that the range of the frequencies of the vibrations that are generated by the driveshaft assembly can vary, not only from type of vehicle to another, but also under varying operating conditions of the same vehicle. Thus, it would be desirable to provide a center bearing assembly having a natural resonant frequency that can be adjusted in accordance with the operating conditions of the vehicle.

SUMMARY OF THE INVENTION

This invention relates to an improved structure for a center bearing assembly having an adjustable pneumatic support member. The bearing assembly includes a bearing and a support member assembly that supports the bearing. The support member assembly includes a bladder having an interior chamber that is filled with a fluid. A bracket is provided that supports the support member assembly for pivoting movement relative thereto. A system is provided for controlling the magnitude of the fluid pressure within the interior chamber of the bladder. The system includes a plurality of sensors that generate signals that are representative of a plurality of operating conditions. A controller is responsive to the sensor signals and generates a signal to a pressure regulating device that controls the magnitude of the fluid pressure within the interior chamber of the bladder.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
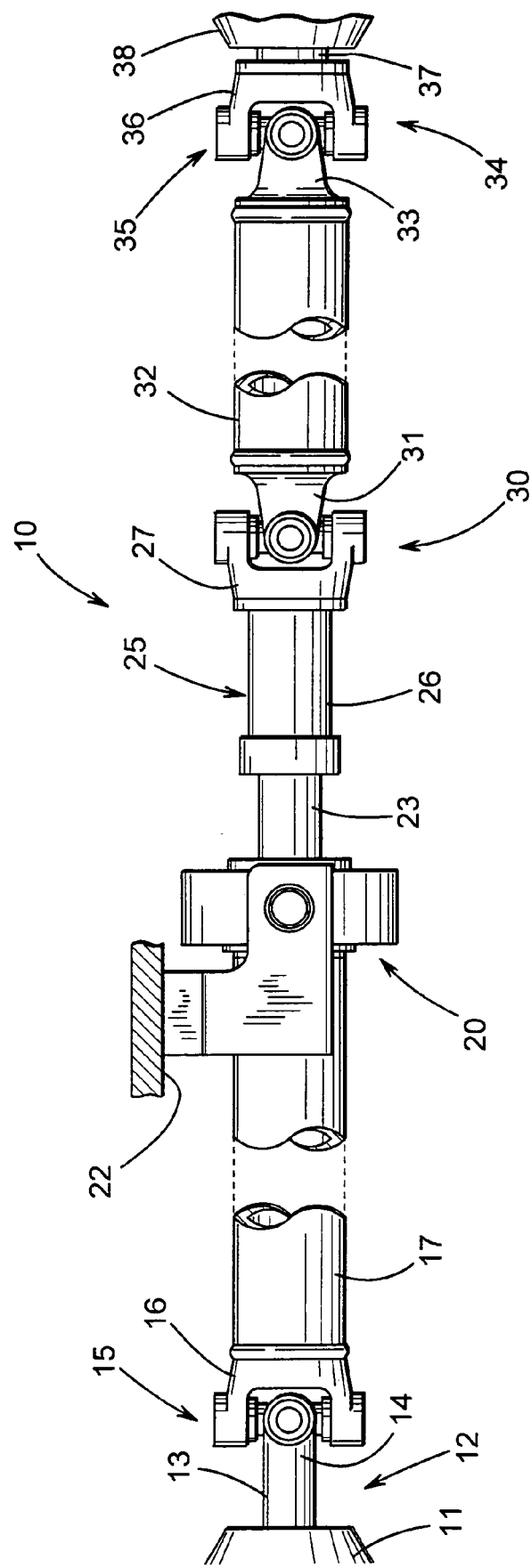
FIG. 1 is a side elevational view of a drive train system including a center bearing assembly secured to a support surface in accordance with this invention.

Referring now to the drawings, there is illustrated in FIG. 1 a drive train system, indicated generally at 10, in accordance with this invention. The illustrated drive train system 10 is, in large measure, conventional in the art and is intended merely to illustrate one environment in which this invention may be used. Thus, the scope of this invention is not intended to be limited for use with the specific structure for the drive train system 10 illustrated in FIG. 1 or with drive train systems in general. On the contrary, as will become apparent below, this invention may be used in any desired environment for the purposes described below.

The illustrated vehicle drive train system 10 is adapted to transmit rotational power from a source, such as an engine/transmission assembly 11 to a driven device, such as a plurality of driven wheels (not shown). The engine/transmission assembly 11 is conventional in the art and includes an externally splined output shaft (not shown) that is connected to a first slip yoke, indicated generally at 12. The first slip yoke 12 is conventional in the art and includes an end portion 13 having a smooth cylindrical outer surface and an internally splined inner surface. The internally splined inner surface of the end portion 13 of the first slip yoke 12 engages the externally splined output shaft of the engine/transmission assembly 11 in a known manner. As a result, the first slip yoke 12 is rotatably driven by the output shaft of the engine/transmission assembly 11, but is free to move axially relative thereto to a limited extent.

The first slip yoke 12 further includes a yoke portion 14 that forms one part of a first universal joint assembly, indicated generally at 15. The first universal joint assembly 15 is also conventional in the art and includes a tube yoke 16 that is connected to the yoke portion 14 of the first slip yoke 12 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of angular misalignment therebetween.

The first driveshaft section 17 extends through and is supported for rotation by a first embodiment of a center bearing assembly, indicated generally at 20. The structure of the first embodiment of the center bearing assembly will be explained in detail below. The first embodiment of the center bearing assembly 20 is secured to a support surface 22, such as a portion of a frame, chassis, or body of the vehicle. The first driveshaft section 17 has a second end 23 that, in the illustrated embodiment, is reduced in diameter relative to the first end of the first driveshaft section 17, although such is not necessary. The reduced diameter end 23 can be formed as a separate structure that is welded onto the larger diameter first end of the first drive shaft section 17. In any event, a portion of the outer surface of the reduced diameter second end 23 of the first driveshaft section 17 is formed having a plurality of external splines (not shown).

A second slip yoke, indicated generally at 25, is connected, such as by welding, to the reduced diameter second end 23 of the first driveshaft section 17 for rotation therewith. The second slip yoke 25 is conventional in the art and includes an end portion 26 having an internally splined inner surface (not shown). The internally splined inner surface of the end portion 26 of the second slip yoke 25 engages the externally splined portion of the second end 23 of the first driveshaft section 17 in a known manner. As a result, the second slip yoke 25 is rotatably driven by the first driveshaft section 17, but is free to move axially relative thereto to a limited extent.

The second slip yoke 25 further includes a yoke portion 27 that forms one part of a second universal joint assembly, indicated generally at 30. The second universal joint assembly 30 is also conventional in the art and includes a tube yoke 31 that is connected to the yoke portion 27 of the second slip yoke 25 by a cross in a known manner. The tube yoke 31 is secured, such as by welding, to a first end of a second driveshaft section 32 for rotation therewith. The second universal joint assembly 30 thus provides a rotational driving connection between the second end 23 of the first driveshaft section 17 and the first end of the second driveshaft section 32, while permitting a limited amount of angular misalignment therebetween.

The second end of the second driveshaft section 32 is secured, such as by welding to a tube yoke 33 that forms one part of a third universal joint assembly, indicated generally at 34. The third universal joint assembly 34 is also conventional in the art and includes a third slip yoke, indicated generally at 35. The third slip yoke 35 is conventional in the art and includes a yoke portion 36 that is connected to the tube yoke 33 by a cross in a known manner. The third slip yoke 35 further includes an end portion 37 having a smooth cylindrical outer surface and an internally splined inner surface (not shown). The internally splined inner surface of the end portion 37 of the third slip yoke 35 engages an externally splined input shaft (not shown) of a conventional axle assembly 38 that is connected to the plurality of driven wheels of the vehicle in a known manner. As a result, the input shaft of the axle assembly 38 is rotatably driven by the second driveshaft section 32, but is free to move axially relative thereto to a limited extent.

Figure 2:
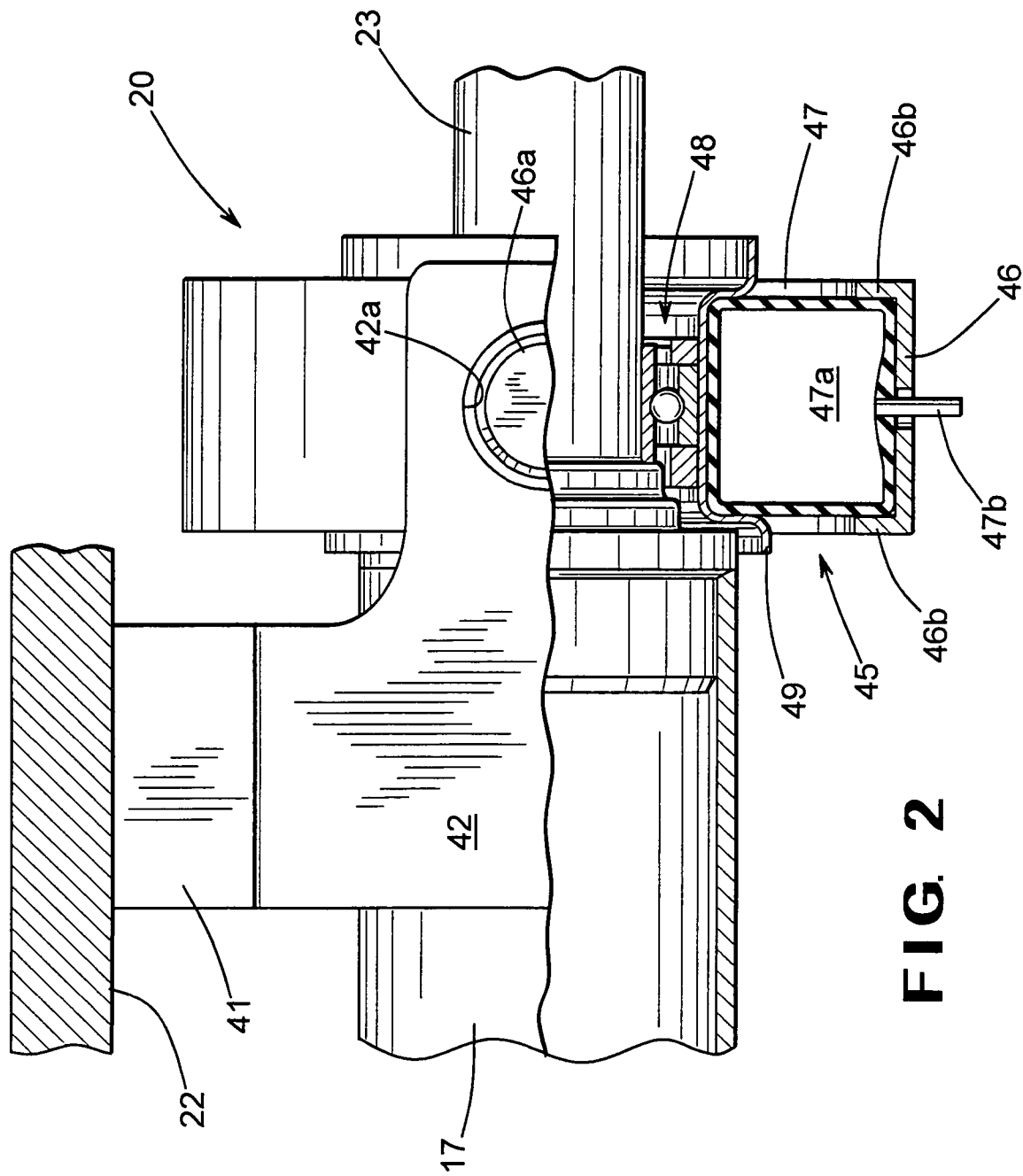
FIG. 2 is an end elevational view, partially broken away, of the center bearing assembly illustrated in FIG. 1.
Figure 3:
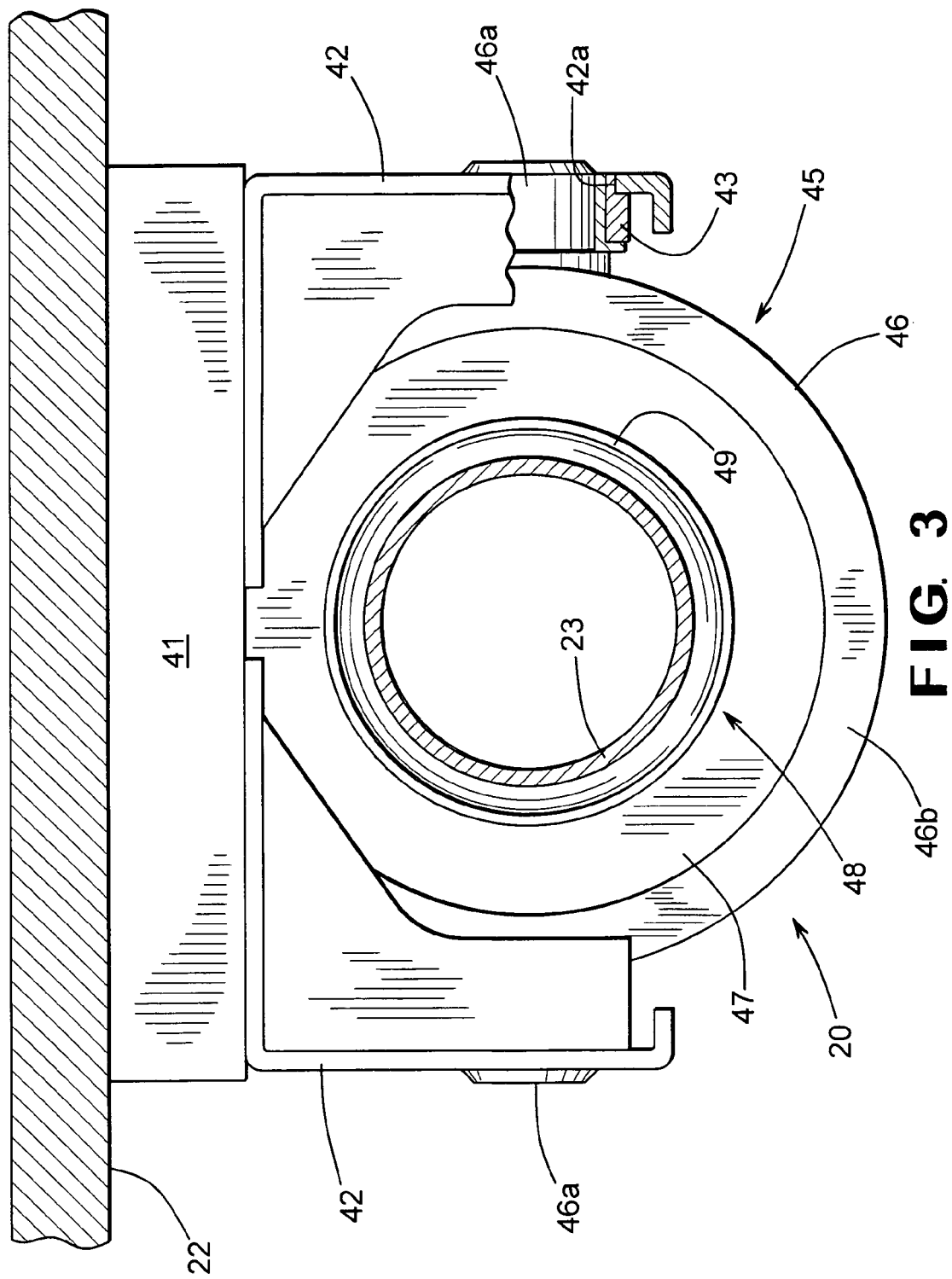
FIG. 3 is a side elevational view, partially broken away, of the center bearing assembly illustrated in FIGS. 1 and 2.
Figure 4:
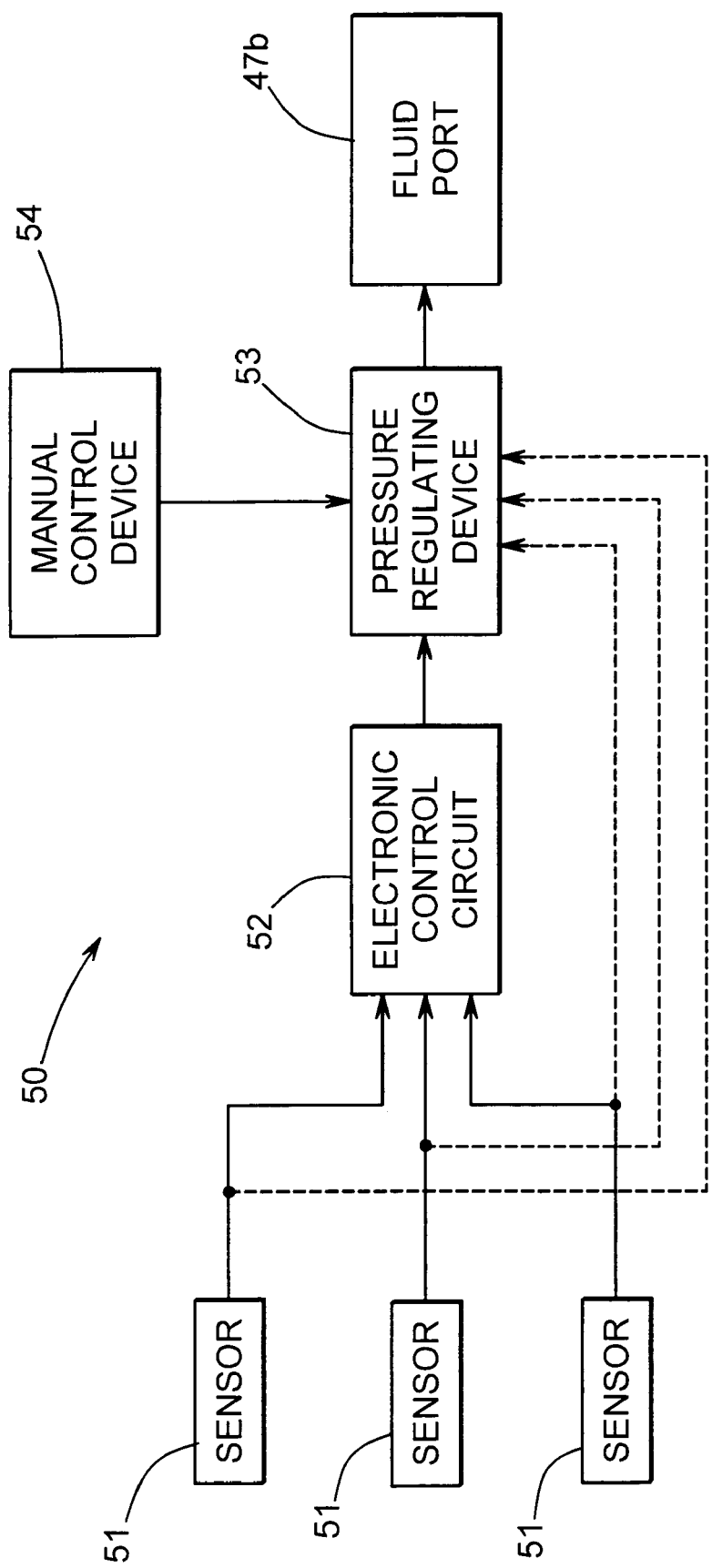
FIG. 4 is a block diagram of a control system for the center bearing assembly illustrated in FIGS. 1, 2, and 3.

Referring now to FIGS. 2, 3, and 4, the structure of the center bearing assembly 20 is illustrated in detail. As shown therein, the center bearing assembly 20 includes a mounting bracket 41 that is secured to the support surface in any conventional manner, such as by a plurality of threaded fasteners (not shown). The illustrated center bearing assembly 20 also includes a pair of support brackets 42 that are secured to and extend from the mounting bracket 41. As best shown in FIG. 3, the illustrated support brackets 42 are generally L-shaped, although such is not required. Each of the support brackets 42 has an opening 42a formed therethrough, and a hollow cylindrical bushing 43 is disposed within each of such openings 42a. The illustrated bushings 43 are press fit within the respective openings 42a formed through the support brackets 42, although such is not required. Preferably, as also shown in FIG. 3, the two support bracket openings 42a are co-axially aligned with one another.

The center bearing assembly 20 also includes a support member assembly, indicated generally at 45, that is supported on the support brackets 42. The illustrated support member assembly 45 includes an annular housing 46 having a pair of trunnions 46a provided thereon. The housing 46 and the trunnions 46a are preferably formed from a relatively strong and rigid material or group of materials, such as metallic material, although any desired material or materials may be used. The illustrated trunnions 46a extend from opposite sides of the housing 46 respectively within the bushings 43 provided on the support brackets 42. The trunnions 46a are supported within the bushings 43 for relative rotational movement. Thus, the housing 46 is supported on the support brackets 42 for pivoting movement relative to the axis defined by the co-axially aligned openings 42a. If desired, the housing 46 may have a pair of flanges 46b extending thereabout to provide additional strength and rigidity thereto.

The center bearing assembly 20 further includes an annular bladder 47 that is supported within the housing 46. The illustrated bladder 47 is shaped in the form of a hollow torus, thus defining an interior chamber 47a. The bladder 47 includes an fluid port 47b that provides fluid communication with the interior chamber 47a. In a manner that is described in detail below, the fluid port 47b can be used to pass a fluid, such as a liquid material or a gaseous material, either into or out of the interior chamber 47a of the bladder 47. Preferably, the bladder 47 is formed from a relatively flexible material, such as rubber. However, the bladder 47 may be formed having any desired shape and from any desired material.

Lastly, the center bearing assembly 20 includes an annular bearing assembly, indicated generally at 48, that is supported within the bladder 47. The bearing assembly 48 is conventional in the art and is provided to rotatably support the first driveshaft section 17. To accomplish this, the bearing assembly 48 includes an outer race that is supported on the bladder 47, an inner race that engages the outer surface of the first driveshaft section 17, and a plurality of balls disposed between the outer race and the inner race. As a result, the inner race of the bearing assembly 48 is supported for rotation relative to the outer race thereof. In this manner, the first driveshaft section 17 is supported for rotation by the center bearing assembly 20. If desired, the bearing assembly 48 can include a generally hollow and cylindrical sensor mounting bracket 49 that is disposed between the outer race of the bearing assembly 48 and the bladder 47. The purpose of the sensor mounting bracket 49 will be explained below.

It is common for the driveshaft portion of the drive train system 10 (including some or all of the first universal joint 15, the first driveshaft section 17, the center bearing assembly 20, the second universal joint 30, the second driveshaft section 32, and the third universal joint 34) to be assembled in a first location, then shipped to a second location for installation on a vehicle or other device. When the driveshaft assembly is installed on the vehicle, the angular orientation of the housing 46 of the center bearing assembly 20 can be preliminarily adjusted relative to the support brackets 22 and the mounting bracket 21 in accordance with the specific requirements of the particular vehicle or other device upon which the drive train system 10 is to be used. This is possible because, as discussed above, the housing 46 of the center bearing assembly 20 is supported on the support brackets 42 for pivoting movement relative to the axis defined by the co-axially aligned openings 42a. As a result, it is not necessary to provide a plurality of differently shaped mounting brackets to allow a single center bearing assembly design to be used on a plurality of different vehicles. The center bearing assembly 20 of this invention can also accommodate some relative angular movement of the first driveshaft section 17 relative to the support surface 22 that can occur during normal operation of the drive train system 10.

Also, during operation of the drive train system 10, the engine/transmission assembly 11 typically generates a variety of torsional and other relatively high frequency vibrations during use. Such vibrations often result in the generation of noise that can undesirably be transmitted to the support surface 22. The resilient bladder 47 is provided in the center bearing assembly 20 to absorb at least some of such vibrations so as to reduce the amount of noise that is transmitted therethrough to the support surface 22. Because the bladder 47 is formed from a flexible material, and further because the interior chamber 47a of the bladder 47 is filled with the fluid, the bladder 47 serves to absorb at least some of such vibrations that would otherwise be transmitted therethrough from the first driveshaft section 17 to the support surface 22.

The magnitude of the fluid pressure contained within the interior chamber 47a of the bladder 47 may be adjusted to vary the vibration dampening characteristics of center bearing assembly 20. Such changes are preferably effected in response to a change in one or more of the operating conditions of the drive train system 10 or in the vehicle or other device in which the drive train system 10 is used. The magnitude of the fluid pressure contained within the interior chamber 47a of the bladder 47 may be increased and decreased by passing fluid either into or out of the interior chamber 47a of the bladder 47, as mentioned above.

FIG. 4 is a block diagram of a control system, indicated generally at 50, for controlling the magnitude of the fluid pressure within the center bearing assembly 20 so as to adjust the vibration dampening characteristics thereof during operation of the drive train system 10. The control system 50 includes a plurality of sensors 51 that generate respective signals that are representative of a plurality of operating conditions of the drive train system 10. Some of the operating conditions that can be monitored by the sensors 51 include, for example, vehicle speed, vehicle acceleration, rotational speed of the driveshaft assembly, angular displacement of first driveshaft section 17, radial acceleration of the center bearing assembly 20, axial acceleration of the center bearing assembly 20, radial displacement of the center bearing assembly 20, and axial displacement of the center assembly 20. Although three of such sensors 51 are illustrated, it will be appreciated that any desired number of such sensors 51 may be provided. One of the sensors 51 may be provided directly on the sensor mounting bracket 49 of the center bearing assembly 20. The other sensors 51 may be provided elsewhere on the drive train system 10 or in the vehicle or other device in which the drive train system 10 is used.

The signals from the sensors 51 are fed to an electronic control circuit 52 that, in turn, is connected to a pressure regulating device 53. The electronic control circuit 52 is conventional in the art and is intended to represent any type of controller that is responsive to the signals from the sensors 51 for controlling the operation of the pressure regulating device 53. For example, the electronic control circuit 52 may be embodied as a conventional microprocessor or similar device that receives input signals from the sensors 51 and generates output signals to the pressure regulating device 53. The pressure regulating device 53 is also conventional in the art and is adapted to control the passage of fluid into and out of the interior chamber 47a of the bladder 47 in accordance with the output signals generated by the electronic control circuit 52. For example, the pressure regulating device 53 may be embodied as a conventional fluid compressor or pump that can, in a first mode of operation, cause fluid to flow into the interior chamber 47a of the bladder 47 and, in a second mode of operation, cause fluid to flow out of the interior chamber 47a of the bladder 47. In this manner, the magnitude of the fluid pressure within the center bearing assembly 20 can be adjusted to vary the vibration dampening characteristics thereof during operation of the drive train system 10. If desired, the control system 50 may include a manual control device 54 that allows an operator to manually control the operation of the pressure regulating device 53, without the use of the sensors 51 or the electronic control circuit 52. In any event, the control system 50 can control the magnitude of the fluid pressure within the center bearing assembly 20 so as to adjust the vibration dampening characteristics thereof during operation of the drive train system 10.

In accordance with the provisions of the patent statutes, the principle and mode of operation of this invention have been described in its preferred embodiment. However, it should be noted that this invention may be practiced otherwise that as specifically illustrated and described without departing from its spirit or scope.

What is claimed is:

1. A bearing assembly comprising:
   a bearing;
   a support member assembly supporting said bearing, said support member assembly including a bladder having an interior chamber that is filled with a fluid;
   a bracket supporting said support member assembly; and
   a system for controlling the magnitude of the fluid pressure within said interior chamber of said bladder, said system including one of:
      a sensor that generates a signal that is representative of an operating condition of said bearing assembly and controls the magnitude of the fluid pressure within said interior chamber of said bladder in response to said signal and
      a manual control device that generates a signal to a pressure regulating device, and wherein said pressure regulating device controls the magnitude of the fluid pressure within said interior chamber of said bladder in response to said signal from said manual control device.

2. The bearing assembly defined in claim 1 wherein said support member assembly includes a housing that supports said bladder, and wherein said bracket supporting said housing.

3. The bearing assembly defined in claim 2 wherein said bracket includes a pair of support brackets that support said housing.

4. The bearing assembly defined in claim 3 wherein said housing has a pair of trunnions that are respectively supported on said pair of support brackets.

5. The bearing assembly defined in claim 1 wherein said system includes a sensor that generates a signal that is representative of an operating condition of said bearing assembly and controls the magnitude of the fluid pressure within said interior chamber of said bladder in response to said signal.

6. The bearing assembly defined in claim 5 wherein said system includes a controller that receives said signal from said sensor and generates a signal to a pressure regulating device that controls the magnitude of the fluid pressure within said interior chamber of said bladder in response to said signal from said controller.

7. The bearing assembly defined in claim 1 wherein said system includes said plurality of sensors that generates a plurality of signals that are representative of a plurality of operating conditions of said bearing assembly and controls the magnitude of the fluid pressure within said interior chamber of said bladder in response to said signals.

8. The bearing assembly defined in claim 1 wherein said system includes said manual control device that generates a signal to said pressure regulating device, and wherein said pressure regulating device controls the magnitude of the fluid pressure within said interior chamber of said bladder in response to said signal from said manual control device.

9. The bearing assembly defined in claim 1 wherein said bracket includes a bushing that supports said support member assembly.

10. The bearing assembly defined in claim 9 wherein said support member assembly includes a housing having a trunnion that is received within said bushing for supporting said support member assembly.

11. The bearing assembly defined in claim 1 wherein said bracket supports said support member assembly for pivoting movement relative thereto.

12. A driveshaft assembly comprising:
    a driveshaft;
    a bearing assembly including a bearing that rotatably supports said driveshaft; a support member assembly supporting said bearing, said support member assembly including a bladder having an interior chamber that is filled with a fluid; and a bracket supporting said support member assembly; and
    a system for controlling the magnitude of the fluid pressure within said interior chamber of said bladder, said system including one of:
       a sensor that generates a signal that is representative of an operating condition of said driveshaft assembly and controls the magnitude of the fluid pressure within said interior chamber of said bladder in response to said signal and
       a manual control device that generates a signal to a pressure regulating device, and wherein said pressure regulating device controls the magnitude of the fluid pressure within said interior chamber of said bladder in response to said signal from said manual control device.

13. The driveshaft assembly defined in claim 11 wherein said support member assembly includes a housing that supports said bladder, and wherein said bracket supporting said housing.

14. The driveshaft assembly defined in claim 12 wherein said bracket includes a pair of support brackets that support said housing.

15. The drive shaft assembly defined in claim 13 wherein said housing has a pair of trunnions that are respectively supported on said pair of support brackets.

16. The driveshaft assembly defined in claim 11 wherein said system includes said sensor that generates a signal that is representative of an operating condition of said driveshaft assembly and controls the magnitude of the fluid pressure within said interior chamber of said bladder in response to said signal.

17. The driveshaft assembly defined in claim 15 wherein said system includes a controller that receives said signal from said sensor and generates a signal to a pressure regulating device that controls the magnitude of the fluid pressure within said interior chamber of said bladder in response to said signal from said controller.

18. The driveshaft assembly defined in claim 11 wherein said system includes a plurality of sensors that generates a plurality of signals that are representative of a plurality of operating conditions of said bearing assembly and controls the magnitude of the fluid pressure within said interior chamber of said bladder in response to said signals.

19. The driveshaft assembly defined in claim 11 wherein said system includes said manual control device that generates a signal to said pressure regulating device, and wherein said pressure regulating device controls the magnitude of the fluid pressure within said interior chamber of said bladder in response to said signal from said manual control device.

20. The bearing assembly defined in claim 12 wherein said bracket supports said support member assembly for pivoting movement relative thereto.

* * * * *